(12) United States Patent
Kasar et al.

(10) Patent No.: US 12,607,861 B2
(45) Date of Patent: Apr. 21, 2026

(54) FACE ENGAGING STRUCTURE

(71) Applicant: Apple Inc., Cupertino, CA (US)

(72) Inventors: Darshan R. Kasar, San Francisco, CA (US); Samuel G. Smith, San Francisco, CA (US); Paul X. Wang, Cupertino, CA (US); Liam R. Martinez, San Francisco, CA (US); Jonathan M. Anderson, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/348,561

(22) Filed: Jul. 7, 2023

(65) Prior Publication Data

US 2024/0061255 A1 Feb. 22, 2024

Related U.S. Application Data

(60) Provisional application No. 63/371,792, filed on Aug. 18, 2022.

(51) Int. Cl.
*G02B 27/01* (2006.01)

(52) U.S. Cl.
CPC .............................. *G02B 27/0176* (2013.01)

(58) Field of Classification Search
CPC ................................................ G02B 27/0176
See application file for complete search history.

(56) References Cited

U.S. PATENT DOCUMENTS

| | | | | |
|---|---|---|---|---|
| 6,034,653 | A * | 3/2000 | Robertson .......... | G02B 27/0176 |
| | | | | 348/794 |
| 9,989,998 | B1 * | 6/2018 | Yee ..................... | G02B 27/0176 |
| 10,419,745 | B2 | 9/2019 | Liu et al. | |
| 10,527,860 | B2 * | 1/2020 | Reed .................. | G02B 27/0176 |
| 10,653,016 | B1 * | 5/2020 | Sullivan .............. | H05K 5/0217 |
| 10,739,600 | B1 * | 8/2020 | Yee ..................... | G02B 27/0176 |
| 10,895,751 | B1 * | 1/2021 | Yee ..................... | G02B 27/028 |
| 2014/0157496 | A1 * | 6/2014 | Ginther .................. | A61F 9/029 |
| | | | | 2/439 |
| 2017/0322410 | A1 * | 11/2017 | Watson ................. | G06T 19/006 |
| 2019/0041643 | A1 * | 2/2019 | Chang .................. | H04N 13/398 |
| 2019/0041899 | A1 | 2/2019 | Ellis et al. | |
| 2019/0113760 | A1 * | 4/2019 | Tatsuta .............. | G02B 27/0176 |
| 2019/0212772 | A1 * | 7/2019 | Chen ................... | G06F 1/1656 |
| 2020/0225493 | A1 * | 7/2020 | Yu ....................... | G02B 27/017 |
| 2020/0233453 | A1 * | 7/2020 | Hatfield ................. | G06F 3/011 |
| 2021/0263323 | A1 | 8/2021 | Ellis et al. | |
| 2022/0326730 | A1 * | 10/2022 | Ashida .................. | G02B 27/02 |
| 2022/0382062 | A1 * | 12/2022 | Cheng .............. | G02B 27/0093 |
| 2023/0418076 | A1 * | 12/2023 | Lindberg ................ | G02B 7/12 |

FOREIGN PATENT DOCUMENTS

| | | |
|---|---|---|
| WO | 2022010796 A2 | 1/2022 |
| WO | 2022060520 A1 | 3/2022 |

OTHER PUBLICATIONS

European Search Report for EP Application No. 23191511.7, mailed Dec. 19, 2023 (7 pp.).

* cited by examiner

*Primary Examiner* — Bipin Gyawali
(74) *Attorney, Agent, or Firm* — Dorsey & Whitney LLP

(57) ABSTRACT

An apparatus includes a display, a facial interface, and a connector between the display and the facial feature. The connector can include a stop.

20 Claims, 12 Drawing Sheets

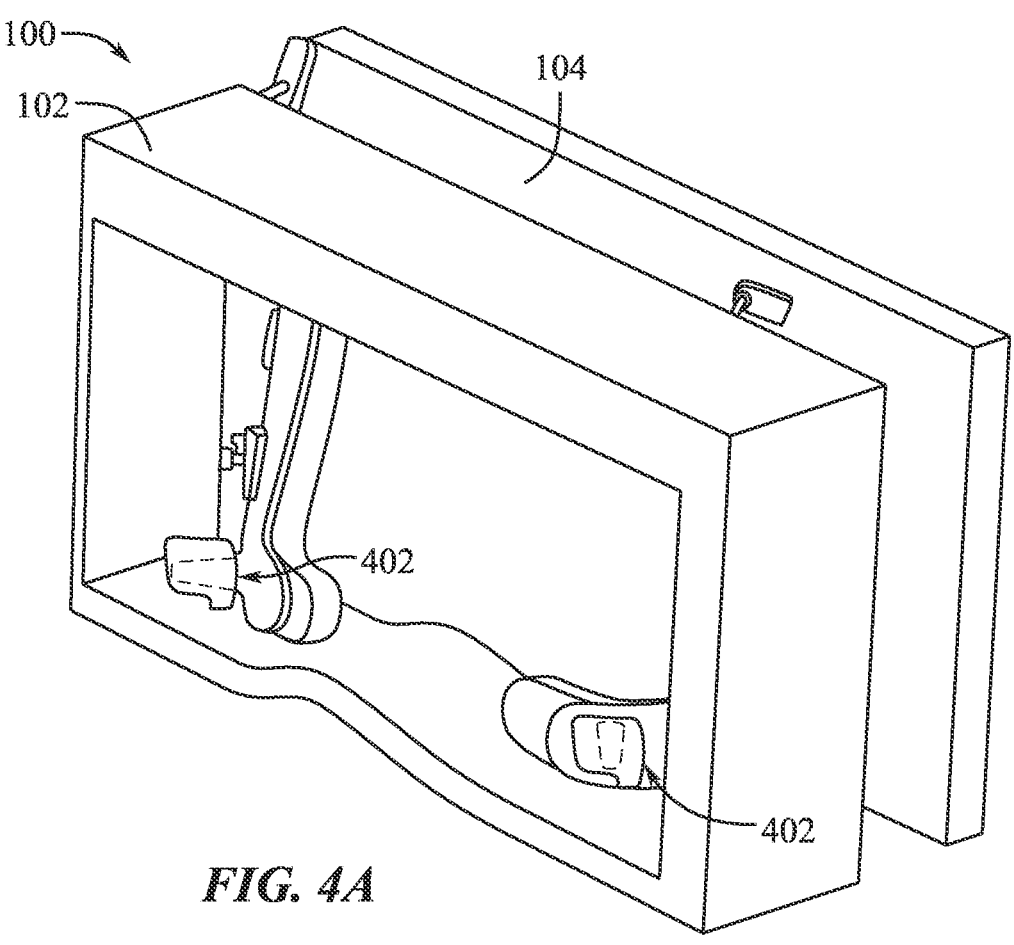
FIG. 4A
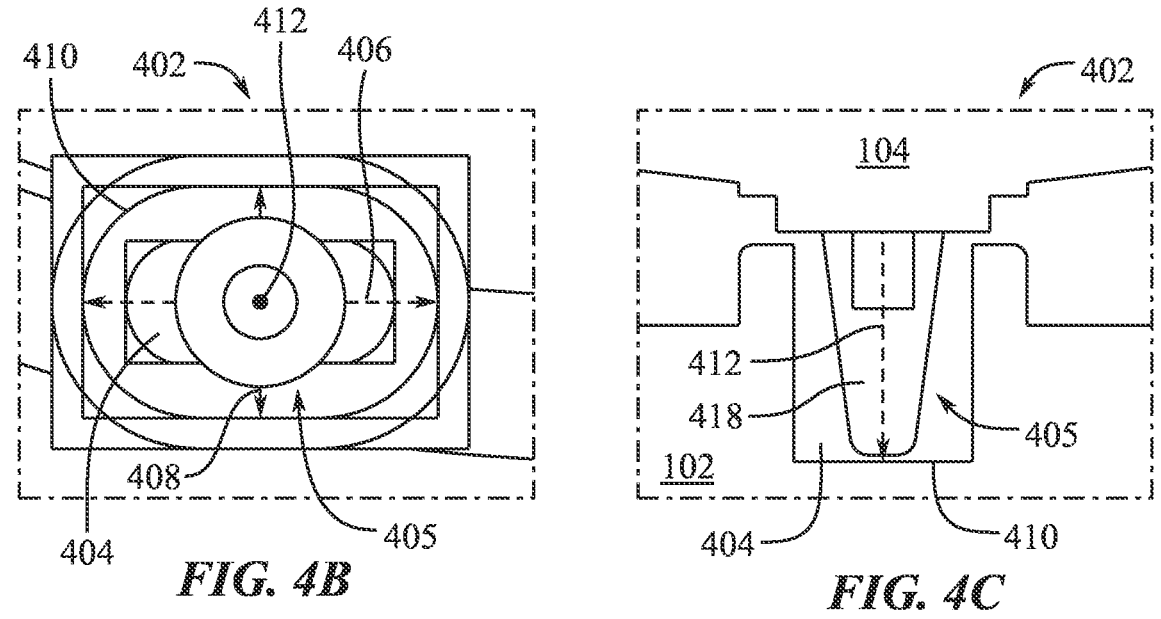
FIG. 4B                    FIG. 4C

FACE ENGAGING STRUCTURE

CROSS-REFERENCE TO RELATED APPLICATION(S)

This claims priority to U.S. Provisional Patent Application No. 63/371,792, filed 18 Aug. 2022, and entitled "FACE ENGAGING STRUCTURE," the entire disclosure of which is hereby incorporated by reference.

FIELD

The described embodiments relate generally to connectors of a head-mountable device. More particularly, the present embodiments relate to maxilla connectors of a head-mountable device.

BACKGROUND

Recent advances in portable computing have enabled head-mountable devices (HMD) that provide augmented and virtual reality (AR/VR) experiences to users. These HMDs have many components, such as a display, a viewing frame, a lens, batteries and other sensitive components. In particular, the HMDs typically include a display, where a user can view and interact with visualizations presented on the display screen of the HMD.

Certain components of the HMD also create a unique user experience or help to provide user comfort. In particular, optimal comfort can be challenging due to the myriad different head shapes, sizes, and contours of facial features of users which an HMD must properly accommodate for the user to have an optimum viewing experience. Indeed, in some instances, when wearing an HMD, comfort may not be optimal if the components may not properly accommodate the user's facial structure.

In addition, HMDs can experience different forces during use, transportation, storage, or other parts of the product lifecycle. Sensitive components can be impacted by the experienced forces. Therefore, what is needed in the art are devices and systems of a head-mountable device capable of withstanding force events during the product lifecycle and that can comfortably accommodate a user's facial profile.

SUMMARY

In at least one example of the present disclosure, an apparatus includes a display, a facial interface, and a connector between the display and the facial feature, the connector including a stop.

In one example, the connector is positioned at a maxilla face region when the apparatus is donned. In one example, the connector includes two degrees of freedom. According to one example, a first degree of freedom includes a translation degree of freedom in a first plane, and a second degree of freedom including an axial depth degree of freedom in a second plant. In one example, the connector includes a pin in a second plane. In one example, the connector includes a pin-and-bowl connector. In one example, a portion of the connector is preloaded to return a threshold distance away from the stop. In one example, the stop is connected to the display. In one example, the connector include a compressible portion. In one example the compressible portion is adhered to the stop.

In at least one example, a wearable apparatus includes a facial interface and a connector positioned at the maxilla region of the facial interface.

In another example, the connector includes a proud engagement portion. In one example, the proud engagement portion includes a slidable post. In one example, a wearable apparatus further includes a display and a recessed engagement portion for the connector positioned on the display or the facial interface. In one example, the recessed engagement portion includes a slidable-post track. In one example, the proud engagement portion slides along the slidable-post track.

In at least one example, a head-mountable device includes a display, a facial interface, a wearable strap connected to at least one of the display or the facial interface, and a pivot connection between the display and the facial interface, the pivot connection can be positioned at a maxilla region of the facial interface. In one example, the head-mountable device further includes a floating connection between the display and the facial interface, the floating connection positioned at a zygoma region of the facial interface. In one example, the floating connection can include a foam material. In one example, the pivot connection can include an amount of travel. In one example, the pivot connection can include a stop bounding the travel.

BRIEF DESCRIPTION OF THE DRAWINGS

The disclosure will be readily understood by the following detailed description in conjunction with the accompanying drawings, wherein like reference numerals designate like structural elements, and in which:

FIG. 4A shows a perspective view of a head-mountable device with an example connector between a display and a facial interface.

FIG. 4B shows a front view of an example connector.

FIG. 4C shows a side view of an example connector portion.

DETAILED DESCRIPTION

Figures 1, 2A:
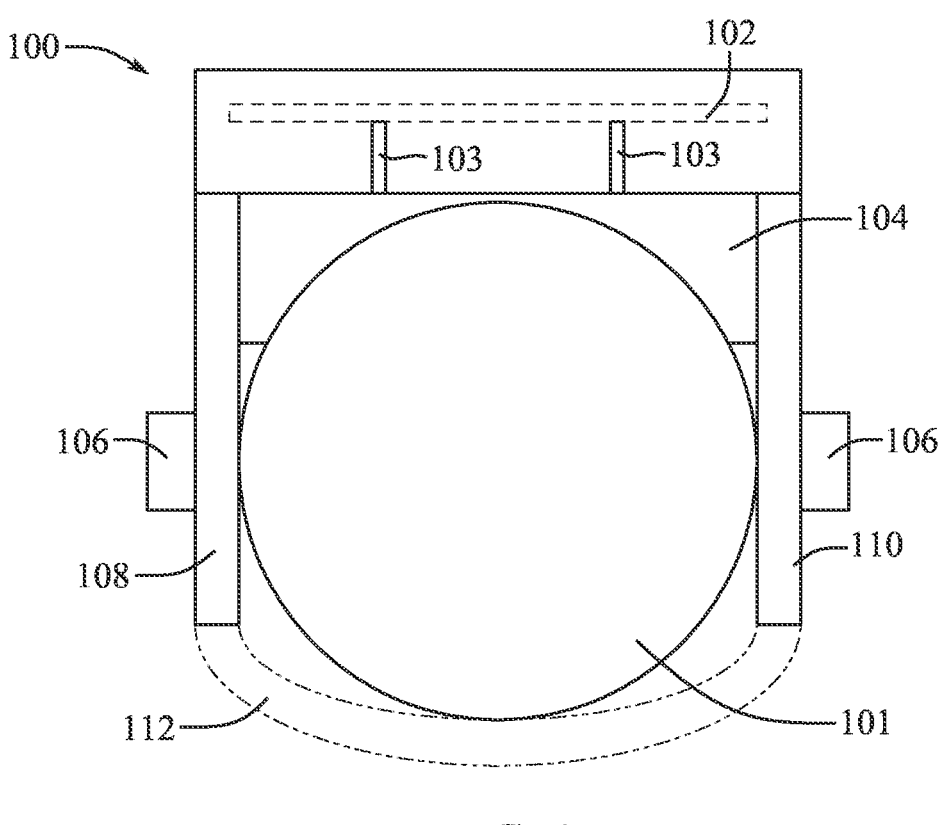
FIG. 1 shows a top view of a head-mountable device including a facial interface.
FIG. 2A shows a side view of a head-mountable device including a facial interface connected to a display.

Detailed reference will be provided below relative to representative embodiments illustrated in the accompanying drawings. The following descriptions are not intended to limit the examples to one preferred embodiment. Instead, it is intended to cover alternatives, modifications, and equivalents as can be included within the spirit and scope of the described embodiments as defined by the appended claims.

The following disclosure relates to connectors of a head-mountable device used for AR/VR experiences. More particularly, the present embodiments relate to connectors positioned at a maxilla region (and nearby zygoma regions) of a face when the head-mountable device is donned. These connectors can dynamically adjust to different heads, as well as dynamically adjust in real time in response to force events. The connectors can also include a variety of different types of connections, as will be described below.

In one example, a head-mountable device includes a connector between a display and a facial interface. In certain implementations, the connector between the display and the facial interface has a stop (e.g., a hard stop). The connector allows for free movement (or multiple degrees of freedom) of the facial interface while still grossly constraining the facial interface. Because the facial interface can freely react to the user's face, pressure can be more evenly distributed to the user's face. The improved load distribution across a user's face can create a pleasant and enjoyable AR/VR experience for the user.

Conventional head-mountable devices do not include connections with a stop. By contrast, the head-mountable device of the present disclosure includes connections with a stop. A stop can stabilize (and in some cases protect from undue force distribution to) the HMD and internal components. A stop can also improve HMD robustness by preventing damage to sensitive components and efficiently transferring a force load through the stop (e.g., to a force-dissipation member, force-spreader member, or predetermined facial feature), thereby improving user comfort.

In one example, a head-mountable device of the present disclosure includes a display and a facial interface with a connector positioned at the maxilla facial region. The connector can include two degrees of freedom and can be a pin-and-bowl connection.

In another example, the connector can include a foam stop adhered to the facial interface. In certain implementations, the foam stop is also coupled to the display. For instance, the foam stop can be preloaded to remain positioned in a "home" (e.g., non-deflected or deflected) state until the head-mountable device is donned.

In yet another example, the connector can include a slidable post. The slidable post can slide relative to the facial interface or the display, as desired.

Accordingly, the apparatuses and systems described herein can provide facial feature adjustments and connections that can increase user customization, and improve distribution of force loads for a head-mountable device, thereby increasing comfort.

These and other embodiments are discussed below with reference to FIGS. 1-8B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a top view profile of a head-mountable device 100 worn on a user head 101. The head-mountable device 100 can include a display 102 (e.g., one or more optical lenses or display screens in front of the eyes of the user). The display 102 can include a display for presenting augmented reality visualizations, a virtual reality visualization, or other suitable visualizations.

The head-mountable device 100 also includes a facial interface 104. As used herein, the term "facial interface" refers to a portion of the head-mountable device 100 that engages with a user face via direct contact. In particular, a facial engagement portion includes portions of the head-mountable device 100 that conform to (e.g., press against) regions of a user face. To illustrate a facial interface can include a pliant (or semi-plaint) face track that spans the forehead, wraps around the eyes, contacts the zygoma and maxilla regions of the face, and bridges the nose. In addition, a facial interface can include various components forming a structure, webbing, cover, fabric, or frame of a head-mountable device disposed between the display 102 and the user skin. In particular implementations, a facial interface can include a seal (e.g., a light seal, environment seal, dust seal, air seal, etc.). It will be appreciated that the term "seal" can include partial seals or inhibitors, in addition to complete seals (e.g., a partial light seal where some ambient light is blocked and a complete light seal where all ambient light is blocked when the head-mountable device is donned).

The head-mountable device 100 further includes connector(s) 103. As used herein, the term "connector" refers to a connection or touch point between the display 102 and the facial interface 104. For instance, a connector can movably constrain the facial interface 104 to the display 102. In certain implementations, a connector includes a joint that physically connects the display 102 and the facial interface 104. In these or other implementations, a connector includes a floating joint or mechanical stop where the facial interface 104 and the display 102 can contact each other (e.g., at rest, after certain amounts of deflection, etc.).

To illustrate, the connector(s) 103 can allow the facial interface 104 to translate (e.g., left-right, up-down,) in one plane. Additionally or alternatively, the connector(s) 103 can allow the facial interface 104 to translate (e.g., depth-wise) in another plane relative to the display 102. For example, the connector(s) 103 allow the facial interface 104 to move between a first state (e.g., a home state when the head-mountable device 100 is not donned by a user) to a second state (e.g., when the head-mountable device 100 is donned by a user). The connector(s) 103 help enable the facial interface 104 to flexibly accommodate the facial profile of the user by deflecting according to the users facial features. When the head-mountable device 100 is removed from the user's head 101, the connector(s) 103 can return to the first state-thereby causing the facial interface 104 to correspondingly move.

The connector(s) 103 can include one or more components (e.g., pins, bowls, slidable posts, foam, mechanical stops, dampeners, spring connections, etc.) that can allow (or actively provide) translation in one or more planes (e.g., at a maxilla region of a face). The connector(s) 103 can include proud engagement portions (e.g., pin, slidable post) and recessed engagement portions (e.g., receptacle, cup, slidable post-track). The proud engagement portions and recessed engagement portions can mate, forming a floating connection (e.g., a receptacle, touch point, mechanical stop, etc. constraining a post from moving in certain directions or beyond certain distances or depths). Additionally or alternatively, the connector(s) 103 can include a frame portion with a protrusion, a post, or a standoff having a compressible end (e.g., an elastomer end) to contact the facial interface 104.

Additionally, as shown in FIG. 1, the head-mountable device 100 can include one or more arms 108, 110. The arm 108, 110 are connected to the display 102 and extend distally toward the rear of the head. The arms 108, 110 are configured to secure the display 102 in a position relative to the user head 101 (e.g., such that the display is maintained in front of a user's eyes). For example, the arms 108, 110 extend over the user's ears 106. In certain examples, the arms 108, 110 rest on the user's ears 106 to secure the head-mountable device 100 via friction between the arms 108, 110 and the user head 101. Optionally, the arms 108, 110 can be connected to each other via a strap 112 (shown in the dashed lines) that can compress the head-mountable device 100 against the user head 101.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2B:
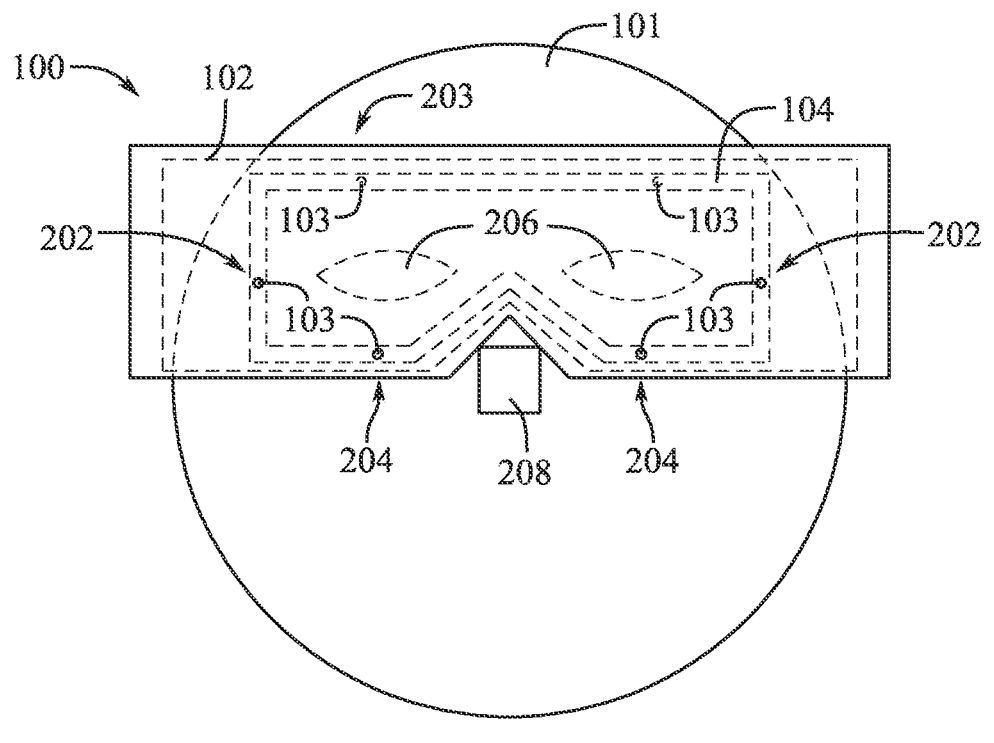
FIG. 2B shows a top view of a head-mountable device including a facial interface connected to a display.

FIGS. 2A-2B illustrate side and front view profiles, respectively, of an example of the head-mountable device 100. As discussed above, the head-mountable device 100 includes the display 102, the facial interface 104, and the connector(s) 103. In particular, as shown in FIGS. 2A-2B, the facial interface 104 can indeed wrap around the eyes 206, bridge the nose 208, span a forehead region 203, contact a zygoma facial region 202, and contact a maxilla facial region 204.

In addition, the connector(s) 103 can be positioned along the maxilla facial region 204 and connect directly (e.g., having a direct connection) or indirectly (e.g., having a floating connection) to the facial interface 104 and the display 102. The connector(s) 103 can similarly be positioned along the zygoma facial region 202 and/or the forehead region 203. In at least some examples, the connector(s) 103 are spatially configured to provide a particular force profile when donned and/or during a force event applying a force load to the display 102.

Further below, this disclosure describes with more particularity how the connector(s) 103 can be constructed. For example, the connector(s) 103 can include pivot connectors, floating connectors, foam connectors, stop connectors, or other connection types (e.g., sliding connectors, rigid connectors), including combinations thereof (such as a hybrid elastomer and mechanical slider).

Any of the features, components, and/or parts, including the arrangements and configurations thereof shown in FIG. 2A-2B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2A-2B.

The connector(s) 103 can provide a stable and flexible interface between the facial interface 104 and the display 102. Additionally or alternatively, the connector(s) 103 include an amount of travel (e.g., an amount of possible displacement). The connector(s) 103 can also provide a datum or a hard stop limiting the travel to a particular separation distance (e.g., a maximum displacement) of the display 102 relative to the facial interface 104. These connector(s) 103 can also increase movement of the facial interface 104 in the maxilla facial region 204 in such a way that the facial interface 104 freely interacts (e.g., conforms) with the user's face without applying excessive pressure back on to the user's face.

Figure 3:
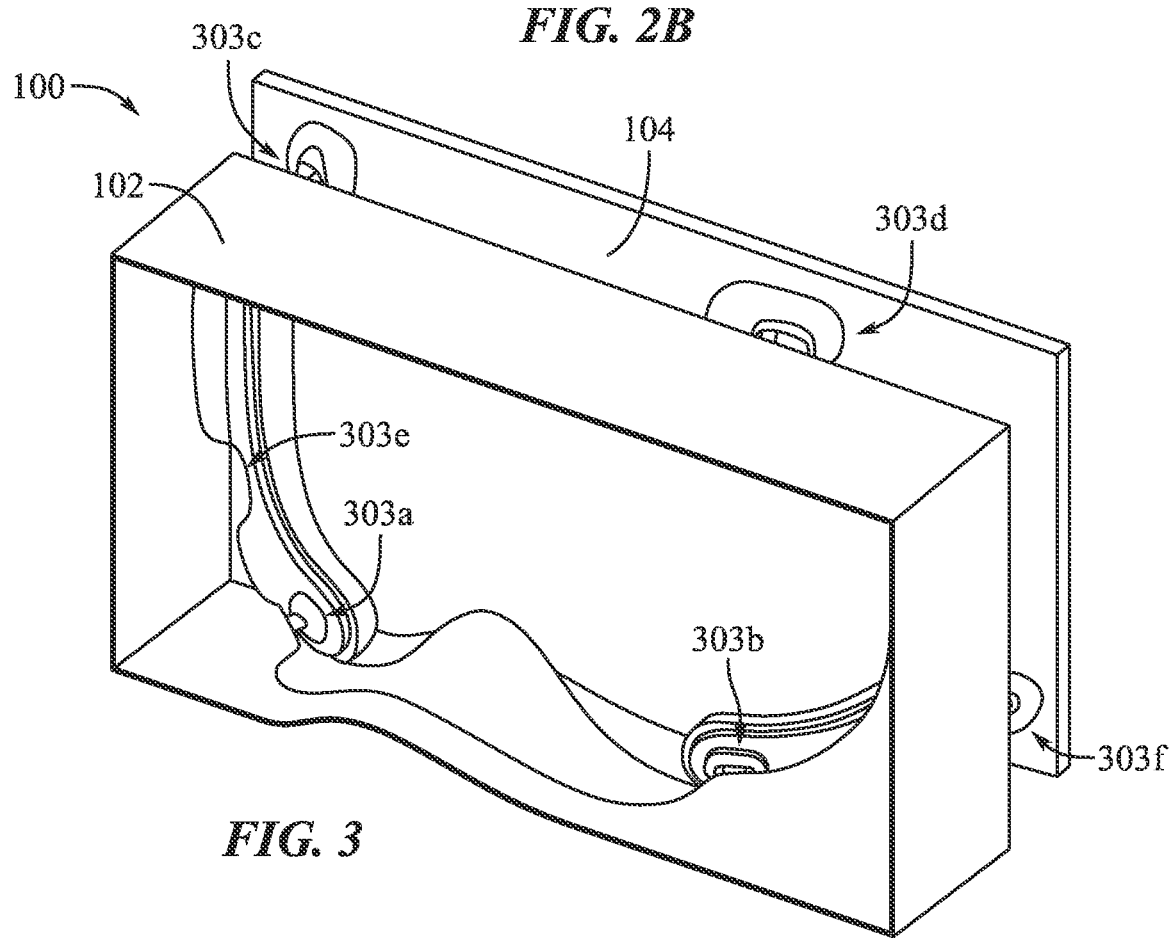
FIG. 3 shows a perspective view of a head-mountable device including a facial interface and an example connector.

In accordance with one or more such examples of the present disclosure, FIG. 3 illustrates an example of the head-mountable device 100 including the display 102, the facial interface 104, and the connector(s) 103 (namely, connectors 303a-303f). The connector(s) 103 (albeit positionable in different places) can specifically be positioned at the maxilla facial region 204 to distribute pressure exerted on a user's face. For example, elastic forces exerted by the strap 112 (not shown) when donning the head-mountable device 100 can be distributed from the display 102 to the facial interface 104 in a comfortable manner via the connectors 303a-303f. In particular, the connectors 103a-103b positioned at the maxilla facial region 204 can conform (e.g., flex, pivot, rotate, etc.) to a user's face evenly distributing the weight of the head-mountable device 100 across the maxilla facial region 204, thereby helping to provide increased comfort to a user.

As shown in FIG. 3, the connectors 303a-303b at the maxilla facial region 204 include a pivot connection. A pivot connection can include one or more different connections that allow pivot action relative to an anchored portion. Thus, a pivot connection can include a ball-and-socket joint, hinged joint, condyloid joint, atlantoaxial joint, radioulnar joint, serial manipulators, etc.

In certain implementations, the anchored portion of the pivot connection for the connectors 303a-303b is positioned on the display 102. Thus, the facial interface 104 can move or pivot relative to the display 102 (e.g., for a comfortable, conforming fit to the user face). In other implementations, however, the anchored portion of the pivot connection for the connectors 303a-303b is positioned on the facial interface 104.

The pivot connection for the connectors 303a-303b can include travel defined by the amount of possible deflection or linear distance movement. In some cases, the pivot connection includes a range of travel between about 2 mm to about 20 mm. In particular implementations, the pivot connection includes about 6 mm of travel. It will be appreciated that the pivot connection also includes a stop (e.g., a portion of the socket joint) bounding the travel.

In at least some examples, the head-mountable device 100 implements additional connectors to change a pressure profile to reduce or avoid "hot-spot loading" lending to acute pressure against a user's face. For example, the head-mountable device 100 includes the connectors 303e-303f positioned at the zygoma facial region 202 to at least partially offload an applied force distributed through the connectors 303a-303b at the maxilla facial region 204. In certain implementations, the connectors 303e-303f include the same type of connection as the connectors 303a-303b. In other implementations, the connectors 303e-303f include a different type of connection than the connectors 303a-303b. For instance, the connectors 303e-303f can include a floating foam joint or a leaf spring joint, and the connectors 303a-303b can include a pivot connection.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

As mentioned above, the head-mountable device of the present disclosure can implement a pin-and-bowl connection between the display 102 and the facial interface 104. In accordance with one or more such examples, FIG. 4A illustrates an example of the head-mountable device 100 including the display 102, the facial interface 104, and the connector(s) 103 (namely connectors 402). FIGS. 4B-4C show a front profile view and side profile view, respectively, of the connectors 402 located at the maxilla facial region 204.

As shown, the connectors 402 include a pin-and-bowl connection. In particular, the connectors 402 include a bowl 404 and a pin 405. The bowl 404 includes a receptacle defined within the display 102 that is configured to receive the pin 405 affixed to the facial interface 104. In particular implementations, the bowl 404 is sized and shaped to receive a particular portion of the pin 405 (e.g., an entirety of the pin 405, an end portion of the pin 405, or a predetermined depth of the pin 405).

In these or other examples, the bowl 404 includes a stop 410 (e.g., an axial dead stop) coupled to the display 102. The stop 410 can control the penetration depth of the pin 405 into the bowl 404. Specifically, the stop 410 allows a maximum displacement or penetration of the pin 405 in an axial direction 412. When the pin 405 abuts the stop 410, the pin 405 is stopped out and cannot proceed further in the axial direction 412—at which point the facial interface 104 and the display 102 are positioned at a predetermined distance from each other (e.g., a minimum separation distance).

The stop 410 can also control other movement of the pin 405 within the bowl 404. In particular, the stop 410 can limit or define translational movement of the pin 405 in directions perpendicular to the axial direction 412.

In particular implementations, the connectors 402 include two degrees of freedom. As illustrated in FIG. 4B, a first degree of freedom includes a translational degree of freedom in a first plane (e.g., defined by a first axis 406 and a second axis 408). A second degree of freedom includes depth-based motion in the axial direction 412, as illustrated in FIG. 4C. The combination of the first degree of freedom and the second degree of freedom allow the facial interface 104 to conform to a user's face while also providing rigidity and stability where appropriate.

According to some examples, the connectors 402 can move along the first degree of freedom (i.e., along the first axis 406) when the pin 405 is positioned at a variety of different depths along the axial direction 412. For example, the connectors 402 can move along the first axis 406 even when the pin 405 is fully depressed (i.e., when the pin 405 is stopped out). In this manner, the connectors 402 can move in response to various forces, such as at least one of an applied load or a shear force. Nonetheless, such movement of the connectors 402 can be bounded by virtue of the pin 405 being retained within the bowl 404.

The pin 405 can include a variety of components and/or materials. In one example, the pin 405 includes a contact portion 418. The contact portion 418 can be firm and rigid. In other examples, the contact portion 418 is soft or compressive. In some examples, the contact portion 418 includes a material such as a foam, an elastomer, a gel, a silicon, a metal, or a thermoplastic.

The pin 405 can also include a variety of different shapes and sizes. In some examples, the pin 405 is cone-shaped. In some instances, a cone shape can allow more freedom of motion at greater distances of separation between the display 102 and the facial interface 104. That is, as the pin 405 compresses further into the bowl 404, the cone-shape of the pin 405 fills more and more volume of the bowl 404, leaving little or no motion for the pin 405. Other shapes, however, are herein contemplated. For instance, the pin 405 can be shaped to resemble a square, rectangle, cylinder, oval, triangle, or other suitable shape.

Further, the connectors 402 can include one or more mechanisms for retaining the pin 405 within the bowl 404 (not shown). For example, a tip of the pin 405 can be sized greater than the opening of the bowl 404. According to another example, the pin 405 and/or the bowl 404 can be sized and shaped such that the pin 405 cannot escape the bowl 404. For example, the pin 405 and/or the bowl 404 can be sized greater than the amount of pin displacement between positional states. In yet another example, the bowl 404 can include a socket-like structure that retains the pin 405.

Any of the features, components, and/or parts, including the arrangements and configurations thereof shown in FIGS. 4A-4C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A-4C.

Figure 5A:
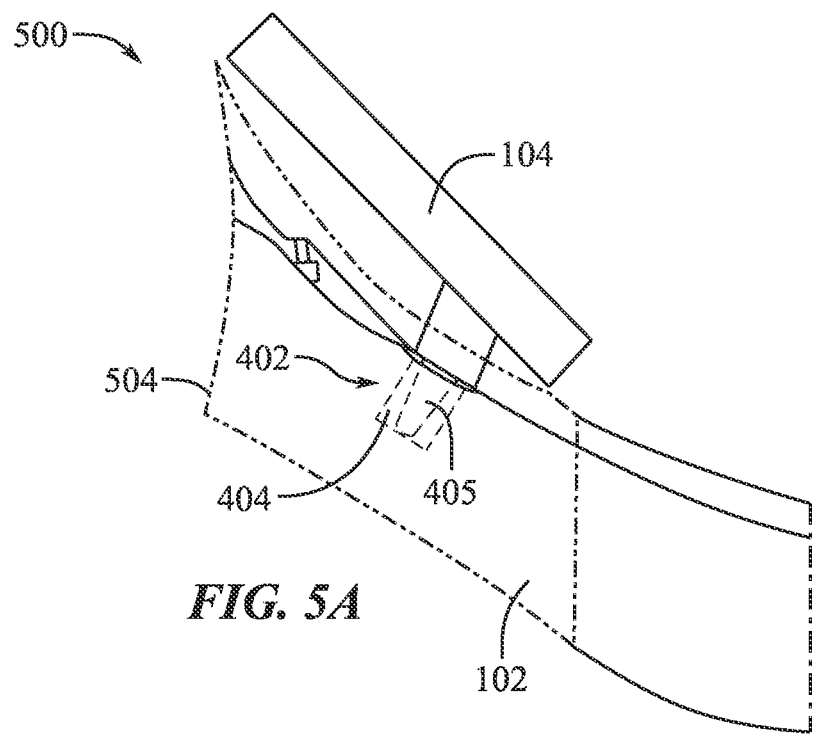
FIGS. 5A-5B show views of a connector in example positional states.

In one example, the connectors of the present disclosure are preloaded (e.g., via springs, elastic materials, etc.) to return to a certain position or state after being moved. In accordance with one or more such examples, FIGS. 5A-5B respectively illustrate states (or positions) of the connectors 402 described above. In particular, FIG. 5A illustrates a first state 500 of the connectors 402 where the pin 405 is stopped out (i.e., bottomed out) within the bowl 404. When in the first state 500, the display 102 and the facial interface 104 are positioned at a predetermined separation distance (e.g., a minimum separation distance). In the first state 500, further travel of the pin 405 into the bowl 404 is disallowed.

In some examples, the first state 500 includes a home state. The home state refers to a position that the connectors 402 rebound to after being deflected. In particular, the home state is the unperturbed position of the connectors 402.

In other examples, however, the first state 500 includes a deflected state. The deflected state refers to a position that the connectors 402 can achieve in response to deflection (e.g., when donning the head-mountable device or during a force event.

Figure 5B:
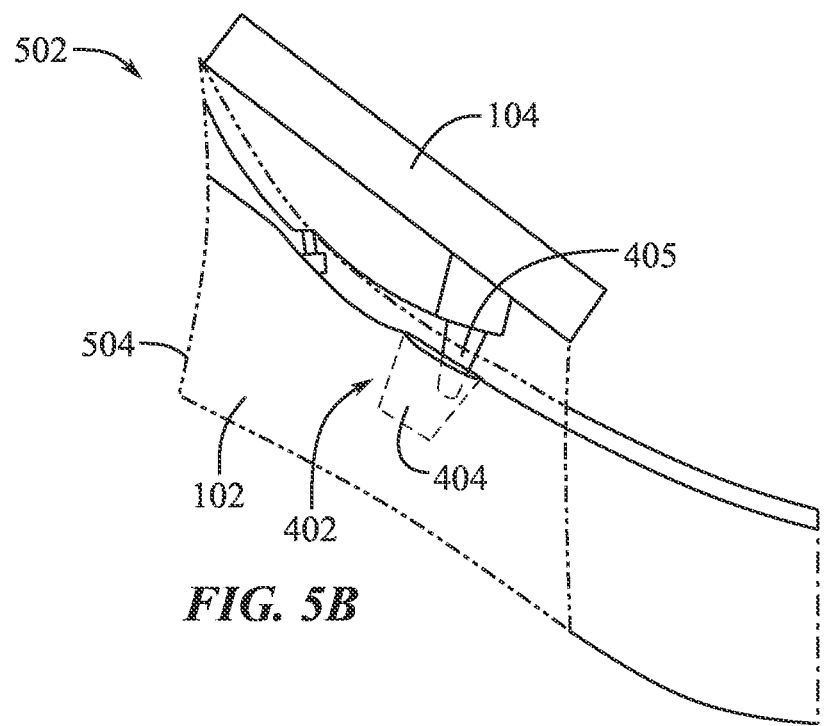

FIG. 5B illustrates a second state 502 of the connectors 402 where the pin 405 is only partially disposed within the bowl 404. In certain cases, the pin 405 is complete withdrawn from the bowl 404. When in the second state 502, the display 102 and the facial interface 104 are movable relative to each other (either closer to or farther away). In the second state 502, further travel of the pin 405 into the bowl 404 is allowed.

Similar to the first state 500, the second state 502 can include a home state. In other implementations, the second state 502 includes a deflected state.

In at least some examples, fabric 504 shown in FIGS. 5A-5B can be stretched or tensioned to accommodate the first state 500 and the second state 502 just described. The fabric 504 can include an adjustable external shell that flexes with movement of the display 102 and the facial interface 104. Thus, as the connectors 402 move to and from the first state 500 and the second state 502, the fabric 504 can correspondingly adjust (e.g., stretch, tighten, loosen, wrinkle, fold, etc.).

According to some examples, the fabric 504 shown in FIGS. 5A-5B can be implemented to bias the connectors of the present disclosure. For example, the fabric 504 can be stretched or tensioned to bias the connectors 402 in a particular home state or a deflected state. In at least some examples, the induced bias of the connectors 402 (provided by the tension from the fabric 504) can facilitate a broad range of connector architectures, ranges of motion, etc.

Any of the features, components, and/or parts, including the arrangements and configurations thereof shown in FIG. 5A-5B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5A-5B.

As mentioned above, the connectors of the present disclosure can include a variety of different connectors, including foam connectors positioned at a maxilla facial region. In accordance with one or more such examples, FIG. 6A illustrates another example of the head-mountable device 100 including the display 102 and the facial interface 104, and the connector(s) 103 (namely connectors 602).

In these or other examples, the connectors 602 include foam connectors. Specifically, the connectors 602 include a foam portion 604 affixed to the facial interface 104 and a base 606 affixed to the display 102. The base 606 is sized and shaped to receive the foam portion 604. In particular implementations, the foam portion 604 is permanently adhered to the base 606 via an attachment 608. The attachment 608 can include glue, bond, or other type of adhesion. Additionally or alternatively, the attachment 608 includes a fastener, such as a bolt, screw, etc.

In at least one example, the connectors 602 include a compressible portion 610, as illustrated in 6B. The compressible portion 610 can also include a foam or other compressible material. In certain implementations, the compressible portion 610 may include a predefined thickness (e.g., about 2 mm, about 3 mm, about 10 mm, etc.) that dictates a corresponding amount of displacement or compression.

Figure 6A:
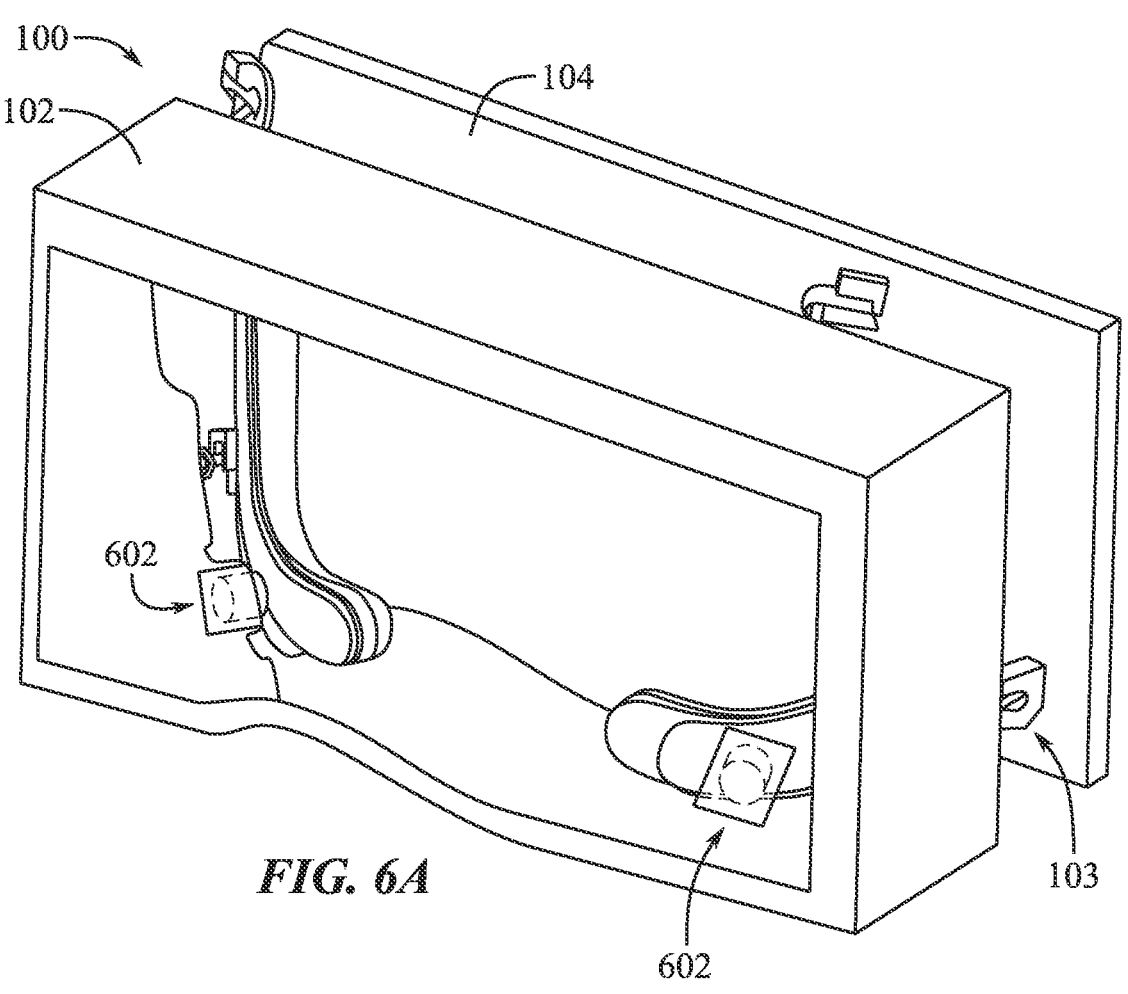
FIG. 6A shows a perspective view of a head-mountable device including a facial interface and another example connector.
Figure 6B:
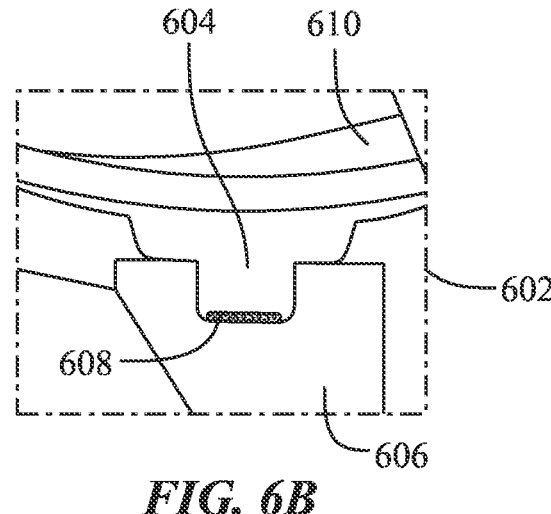
FIG. 6B shows a top view of an example connector.

Any of the features, components, and/or parts, including the arrangements and configurations thereof shown in FIGS. 6A-6B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6A-6B.

As similarly described above, the connectors of the present disclosure can move between states or positions. Foam connections can likewise move between states or positions. In accordance with one or more such examples, FIGS. 7A-7B illustrate positional states of the connectors 602.

Figure 7A:
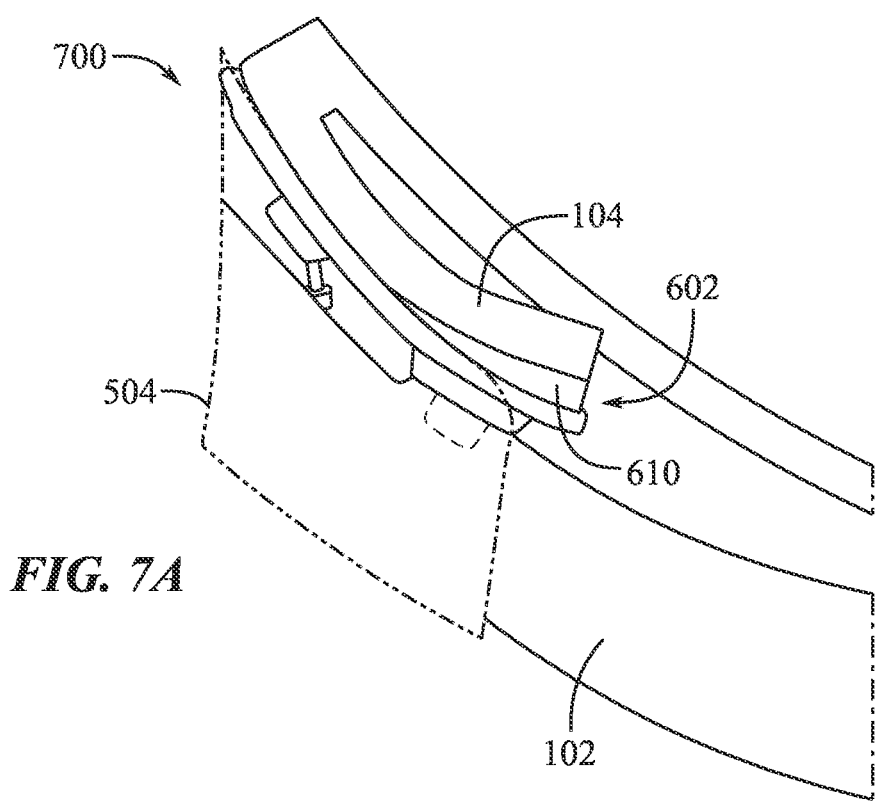
FIGS. 7A-7B show side views of another connector in example positional states.
Figure 7B:
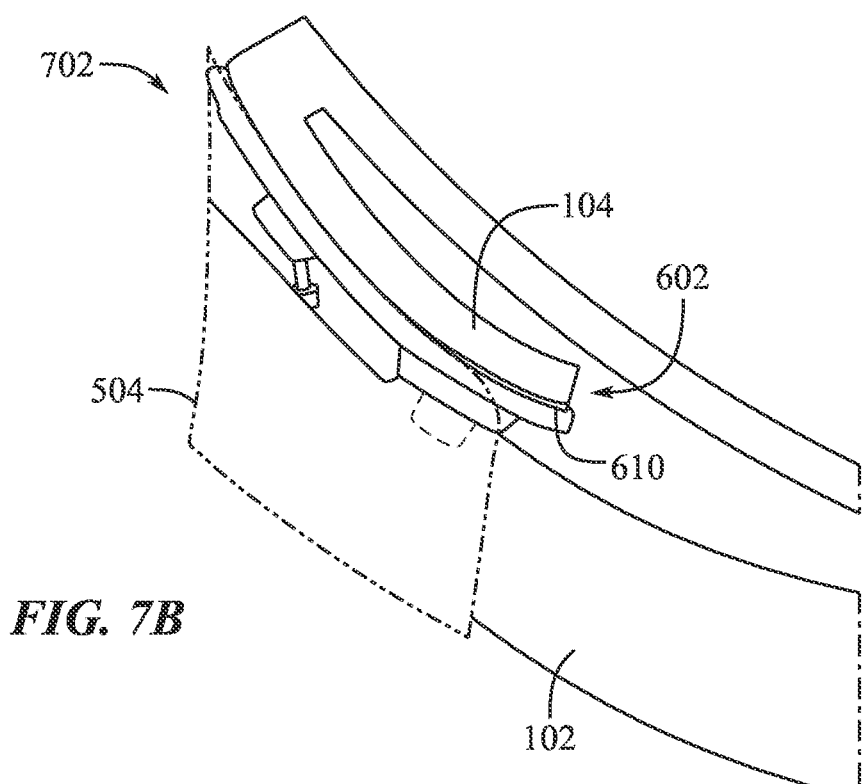

A first state 700 of the connector 602 is shown in FIG. 7A. In the first state 700, the compressible portion 610 is uncompressed and has a first thickness. The second state 702 of the connector 602 is shown in FIG. 7B. Specifically, in the second state 702, the compressible portion 610 is compressed (e.g., reduced in thickness from the first thickness) and has a second thickness less than the first thickness. The compressible portion 610 in the second state 702 need not fully compress. Indeed, the compressible portion 610 can compress partially or fully, as may be the case (e.g., when donning the head-mountable device or during a force event).

It will be appreciated that the first state 700 and the second state 702 can be, respectively, home states and deflected states. However, in certain implementations, the first state 700 and the second state 702 can oppositely configured (i.e., deflected states and home states, respectively).

In at least some examples, the fabric 504 described above can correspondingly move and flex to accommodate the first state 700 and the second state 702 for the connectors 602. Alternatively, the fabric 504 can be attached to non-deflecting portions (e.g., exclusive of the compressible portion 610) such that the fabric 504 need not flex or move.

Any of the features, components, and/or parts, including the arrangements and configurations thereof shown in FIGS. 7A-7B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7A-7B.

Also discussed above, the connectors of the present disclosure can include sliding posts that slide relative to the display 102 or the facial interface 104. These sliding connectors can provide improved ranges of motion (e.g., lateral motion of the maxilla region) while still maintaining comfortable stability and rigidity. In accordance with one or more such examples, FIGS. 8A-8B illustrate connectors 802a-802b positioned at the maxilla region of the facial interface 104.

Figure 8A:
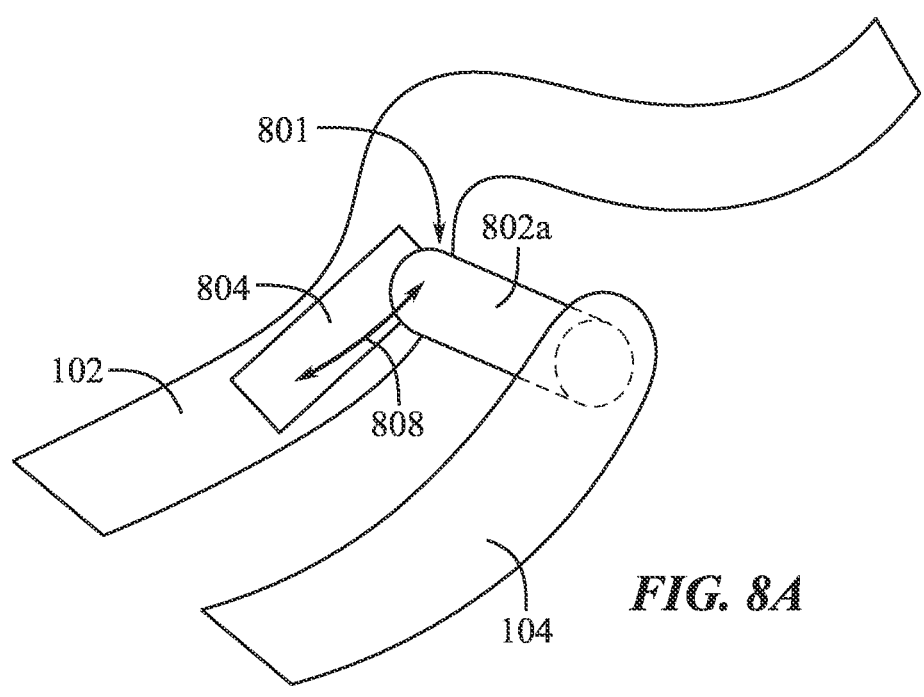
FIGS. 8A-8B show schematic views of an example sliding connector.

As shown in FIG. 8A, the connector 802a is affixed to the facial interface 104 and slidably engaged with the display 102. In particular, the connector 802a includes a slidable post with a proud engagement portion 801. The proud engagement portion 801 interfaces with a recessed engagement portion 804 positioned within the display 102. The recessed engagement portion 804 can include a slidable-post track (e.g., slide mechanism, track, guide, groove, recess, or raceway) defined by one or more surfaces of the display 102. The recessed engagement portion 804 can guide a range of motion for the connector 802a along a direction 808. In this manner, the connector 802a allows the facial interface 104 to comfortably conform to or move with the user's face in a stabilized fashion.

Figure 8B:
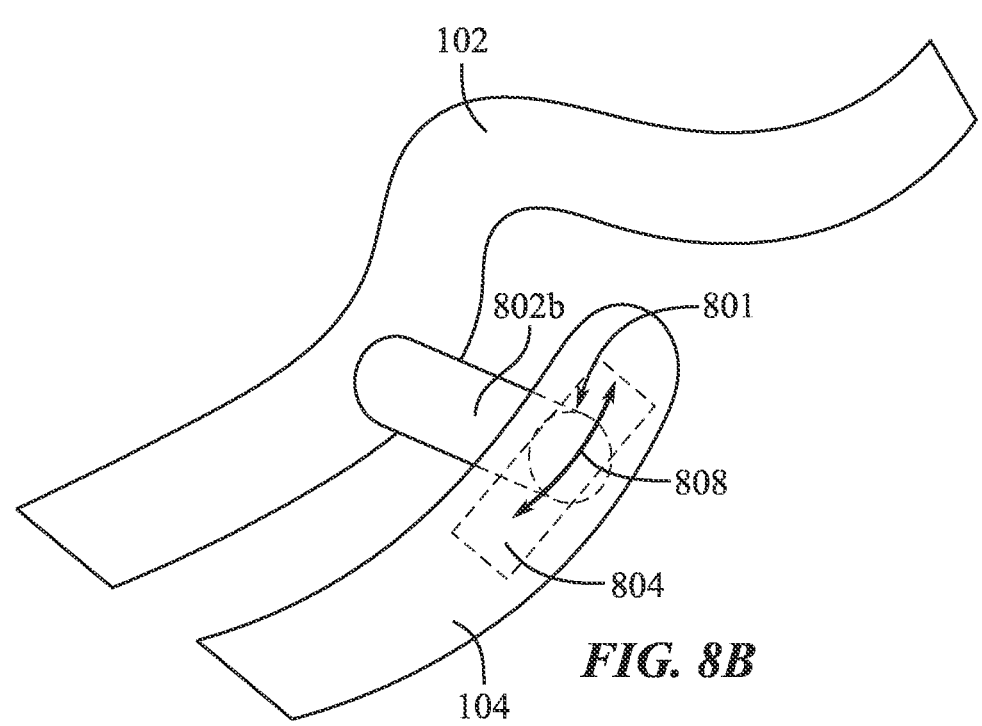

Alternatively, as shown in FIG. 8B, the connector 802b is affixed to the display 102 and slidably engaged with the facial interface 104. The connector 802*b* is the same as the connector 802*a*, except configured in a different positional relationship. In particular, the connector 802*b* includes a slidable post with a proud engagement portion 801. The proud engagement portion 801 interfaces with a recessed engagement portion 804 positioned within the facial interface 104. The proud engagement portion 801 can move along the direction 808 within the facial interface 104.

According to some examples, the mechanical slider examples illustrated in FIGS. 8A-8B can be implemented utilizing a variety of different materials. For example, at least one of the proud engagement portion 801 or the recessed engagement portion 804 can be an elastomer material, metal material, plastic material, composite materials, and the like.

Any of the features, components, and/or parts, including the arrangements and configurations thereof shown in FIGS. 8A-8B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8A-8B.

Myriad other types of connectors are herein contemplated. For instance, the connector(s) 106 of the present disclosure can include a piston-based mechanism. In accordance with one or more such examples, FIGS. 9A-9F illustrate a head-mountable device 900 with a maxilla connector 902 and a zygoma connector 904. The maxilla connector 902 and the zygoma connector 904 movably join the facial interface 104 and the display 102 as similarly described above.

As shown, however, the maxilla connector 902 includes a piston connection, and the zygoma connector 904 includes a pivot connection. The maxilla connector 902 can move in and out in response to application and release of a compressive force at the maxilla region of a face. As the maxilla connector 902 moves, the zygoma connector 904 correspondingly moves (e.g., pivots).

Figure 9A:
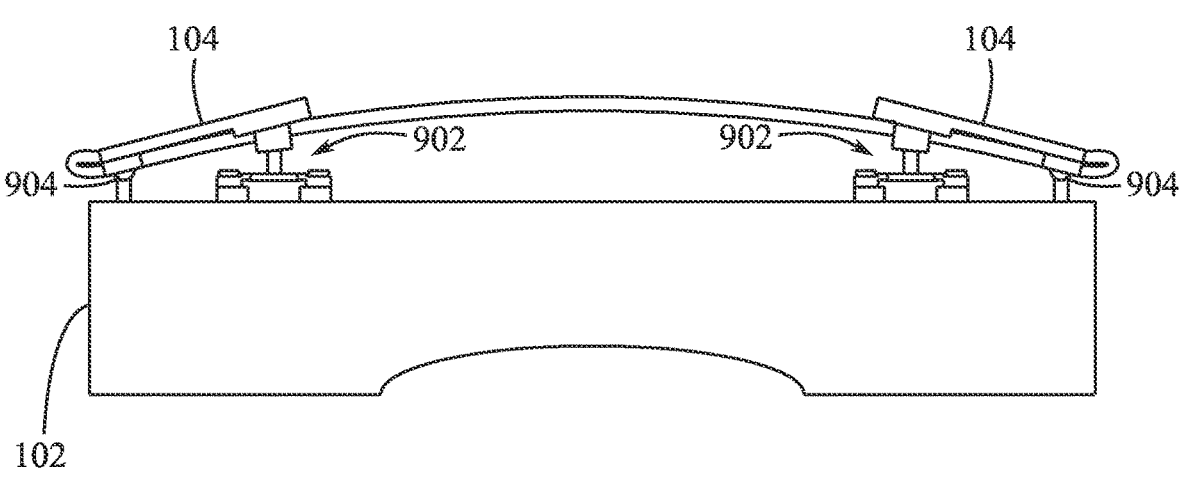
FIG. 9A shows a bottom view of another example head-mountable device.
Figure 9B:
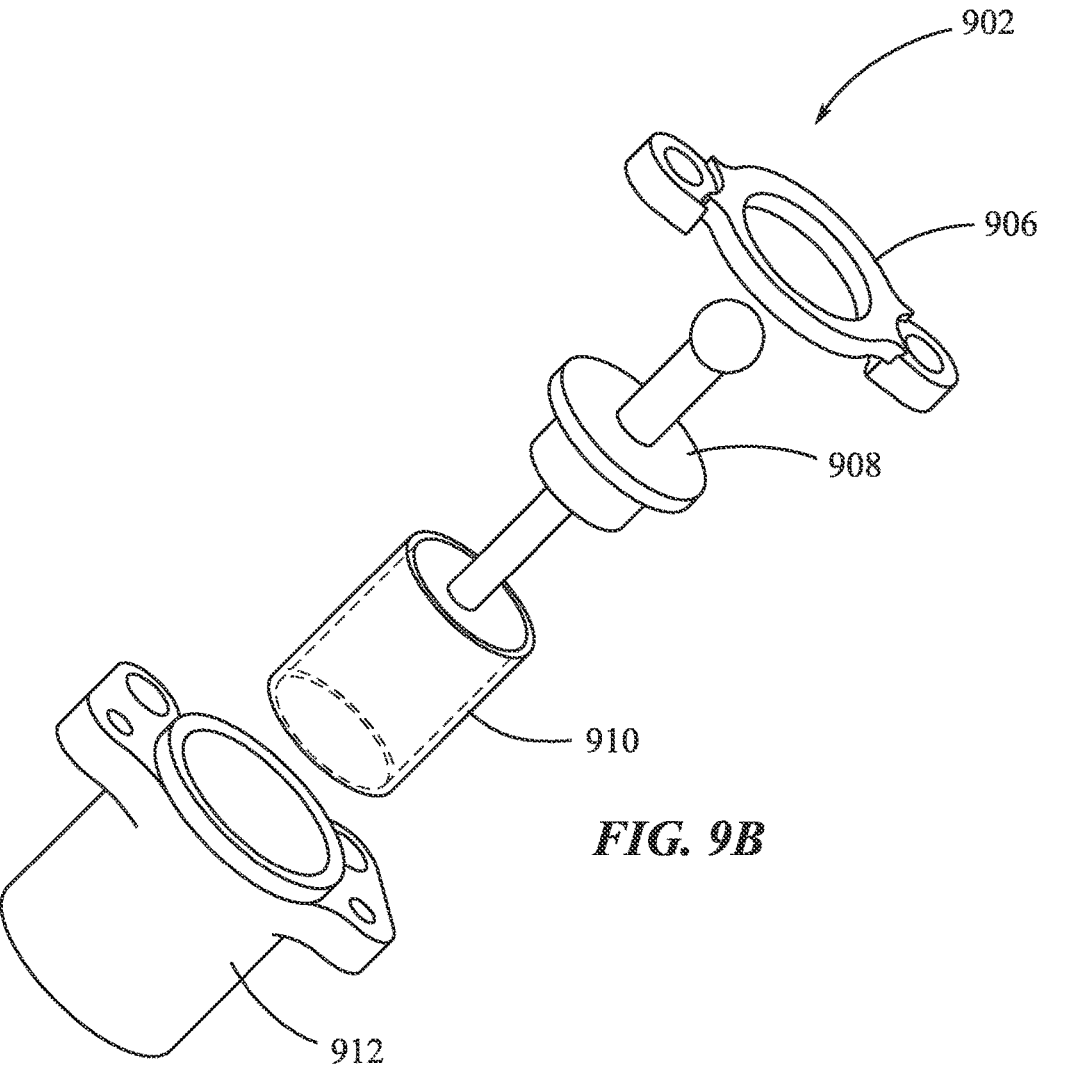
FIGS. 9B-9F show various positions of a connector of a head-mountable device.

FIG. 9B shows that the maxilla connector 902 includes a cap 906, a plunger 908, a compression spring 910, and a housing 912. The cap 906 maintains the components of the maxilla connector 902 in place. The plunger 908 moves in and out of the housing 912, with resistance provided by the compression spring 910. The plunger 908 is also a stop, where compression of the plunger 908 is mechanically stopped due to the body of the plunger 908 abutting a bottom of the housing 912.

Figure 9C:
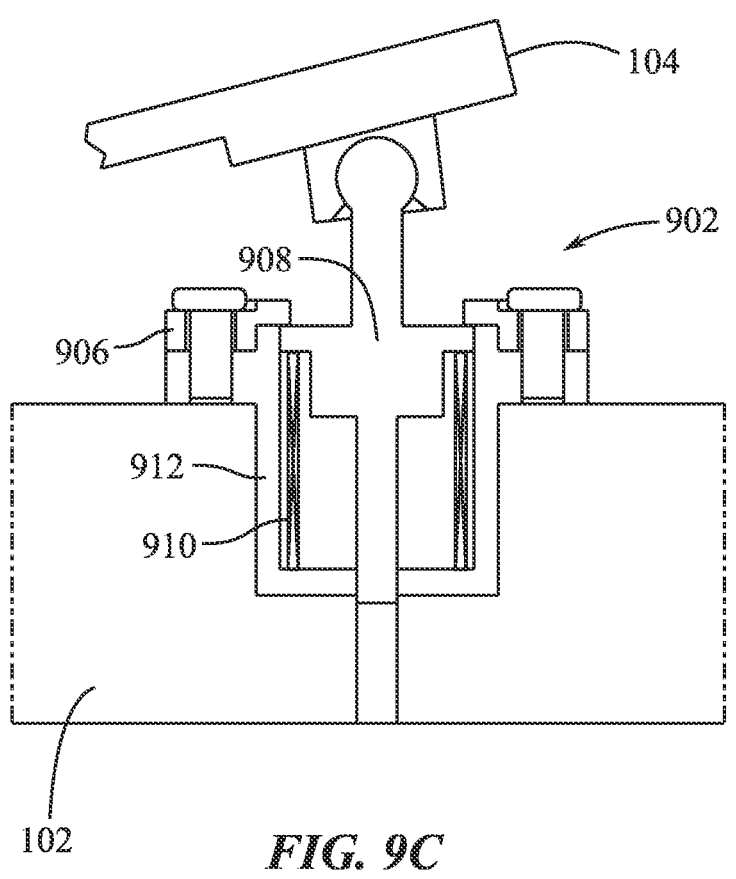
Figure 9D:
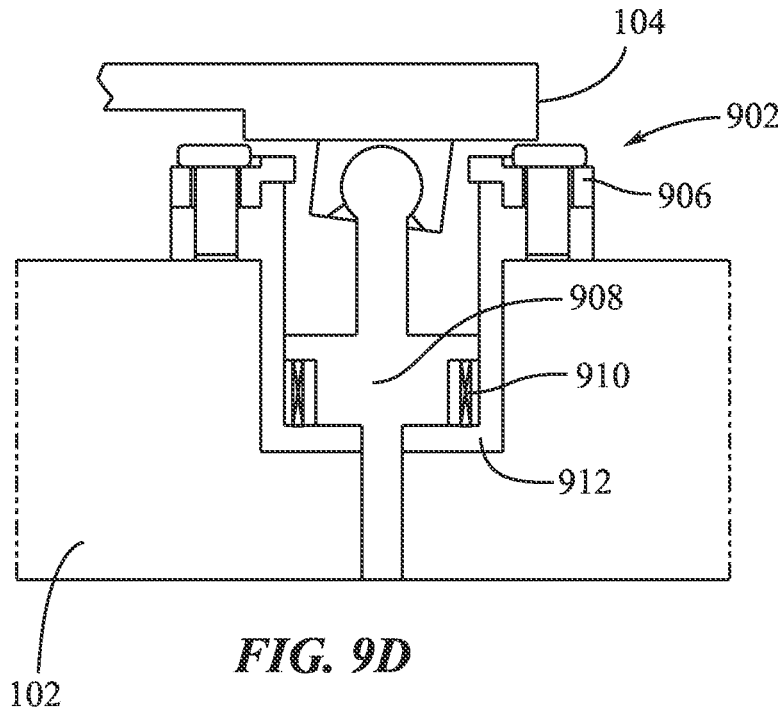

FIG. 9C illustrates the maxilla connector 902 in a nominal (e.g., uncompressed) position. FIG. 9D shows the maxilla connector 902 in a compressed position.

Figure 9E:
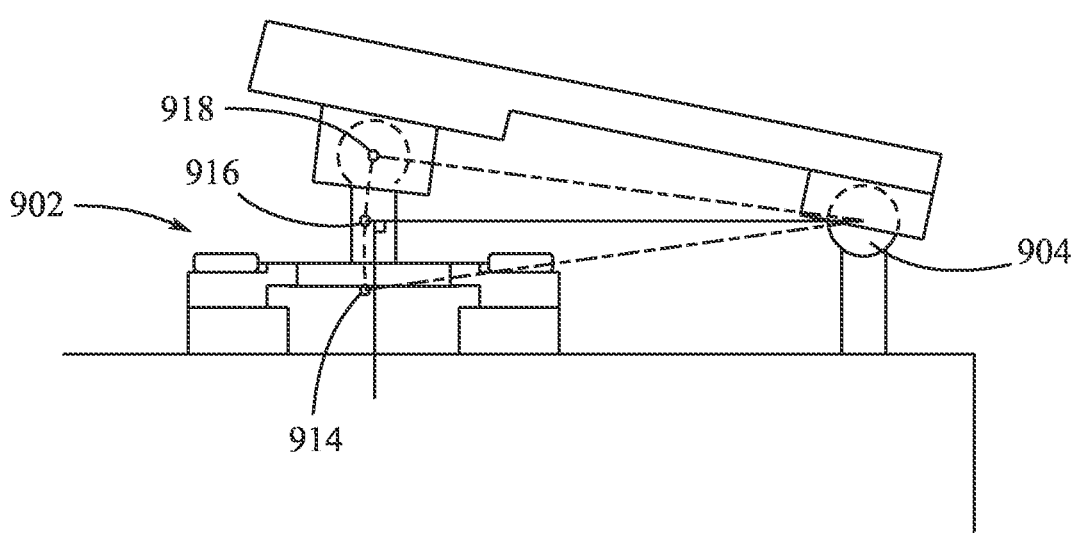
Figure 9F:
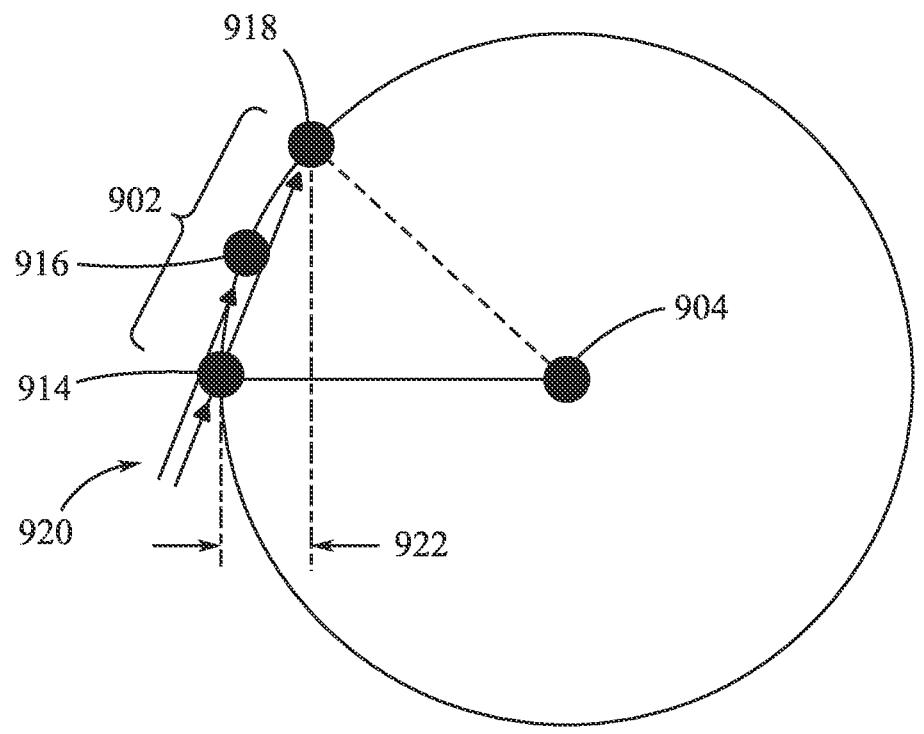

FIGS. 9E-9F show a positional relationship of the maxilla connector 902 relative to the zygoma connector 904 at depth positions 914-918 of the maxilla connector 902. The maxilla connector 902 is positioned in a perpendicular fashion relative to the zygoma connector 904. In particular, the maxilla connector 902 is positioned perpendicular to the zygoma connector 904 at a median (i.e., middle) position, namely the depth position 916. By aligning the piston direction of the maxilla connector 902 to be perpendicular to the depth position 916, an amount of horizontal displacement can be minimized or reduced. In turn, the risk of binding the maxilla connector 902 due to horizontal displacement is also minimized or reduced.

Specifically, a displacement distance 920 in FIG. 9F corresponds to the piston alignment with the depth position 916. In addition, a displacement distance 922 corresponds to an alternative piston alignment (i.e., with the depth position 914). Comparatively, the displacement distance 922 is far greater than the displacement distance 920. In certain implementations, the displacement distance 920 is (for example) about 0.2 mm, and the displacement distance 922 is (for example) about 0.8 mm (e.g., for a 0 to 15 degree rotation of the zygoma connector 904 and a radial distance of about 24 mm). Myriad other positional relationships of the maxilla connector 902 relative to the zygoma connector 904 are herein contemplated.

Any of the features, components, and/or parts, including the arrangements and configurations thereof shown in FIGS. 9A-9F can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 9A-9F.

Figures 10, 11, 12:
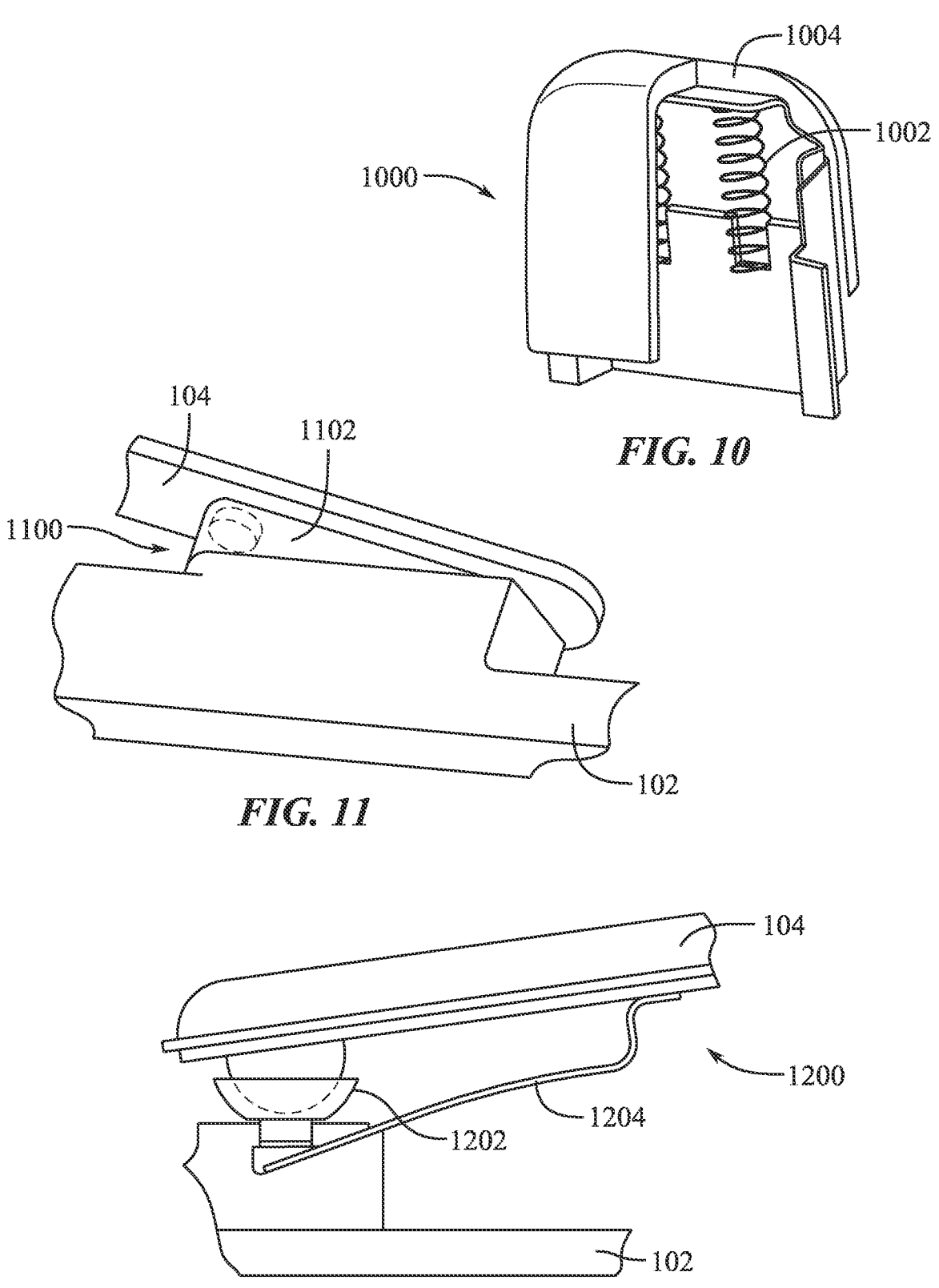
FIG. 10 shows a cutaway view of an example connector.
FIG. 11 shows a perspective view of another example connector.
FIG. 12 shows a side view of yet another example connector.

FIG. 10 illustrates a cutaway view of an example connector 1000 in accordance with one or more examples of the present disclosure. As shown, the connector 1000 includes a spring element 1002. The spring element 1002 can bias internal portions of the connector 1000 (e.g., to facilitate more or less travel or compression of the connector 1000).

Additionally or alternatively to the spring element 1002 (or other suitable internal biasing components), the connector 1000 can include external biasing component(s). For example, a textile 1004 forming an exterior surface of the connector 1000 can also bias the connector 1000. Indeed, the textile 1004 can be stretched or otherwise positioned over the connector 1000 to bias internal components of the connector 1000. In these or other examples, the textile 1004 can include silicone, stretchy fabric (e.g., spandex, polyester, etc.), or other suitable materials.

It will be appreciated that the connector 1000 can be implemented in a variety of ways. In some examples, the connector 1000 includes a floating connection that does not integrally secure the display 102 and the facial interface 104. Rather, the connector 1000 can make contact with (and can compress against) the display 102 or the facial interface 104.

Any of the features, components, and/or parts, including the arrangements and configurations thereof shown in FIG. 10 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 10.

As discussed above, the connectors of the present disclosure can include a variety of different materials. In accordance with one or more examples of the present disclosure, FIG. 11 illustrates an example connector 1100 with an elastomer portion 1102 adjoining the display 102 and the facial interface 104. In some examples, the elastomer portion 1102 can include a thickness of a predetermined amount (e.g., based on a force-displacement profile). Further, in some examples, the elastomer portion 1102 can vary in thickness (e.g., in a tapered fashion). In these or other examples, the elastomer portion 1102 can include various different types of elastomers, such as cis-polyisoprene (natural rubber), cis-polybutadiene (butadiene rubber), styrene-butadiene rubber, and ethylene-propylene monomer. Additionally or alternatively, the elastomer portion 1102 can include a hybrid elastomer material (e.g., part elastomer and part non-elastomer).

Any of the features, components, and/or parts, including the arrangements and configurations thereof shown in FIG. 11 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 11.

FIG. 12 illustrates another example connector 1200 in accordance with one or more examples of the present disclosure. As shown, the connector 1200 includes a ball joint 1202 and a leaf spring 1204. In this manner, the connector 1200 can allow at least some pivoting or twisting about the ball joint 1202. In addition, the connector 1200 can allow tensioned (and tunable) depth adjustment via the leaf spring 1204. Indeed, the leaf spring 1204 can include a variety of different lengths, thicknesses, etc. to provide the desired stiffness (or flexibility) of connection between the display 102 and the facial interface 104. As with other connectors, the leaf spring 1204 can also be formed of various materials, such as metal, plastic, or composite material.

Any of the features, components, and/or parts, including the arrangements and configurations thereof shown in FIG. 12, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 12.

Figure 13:
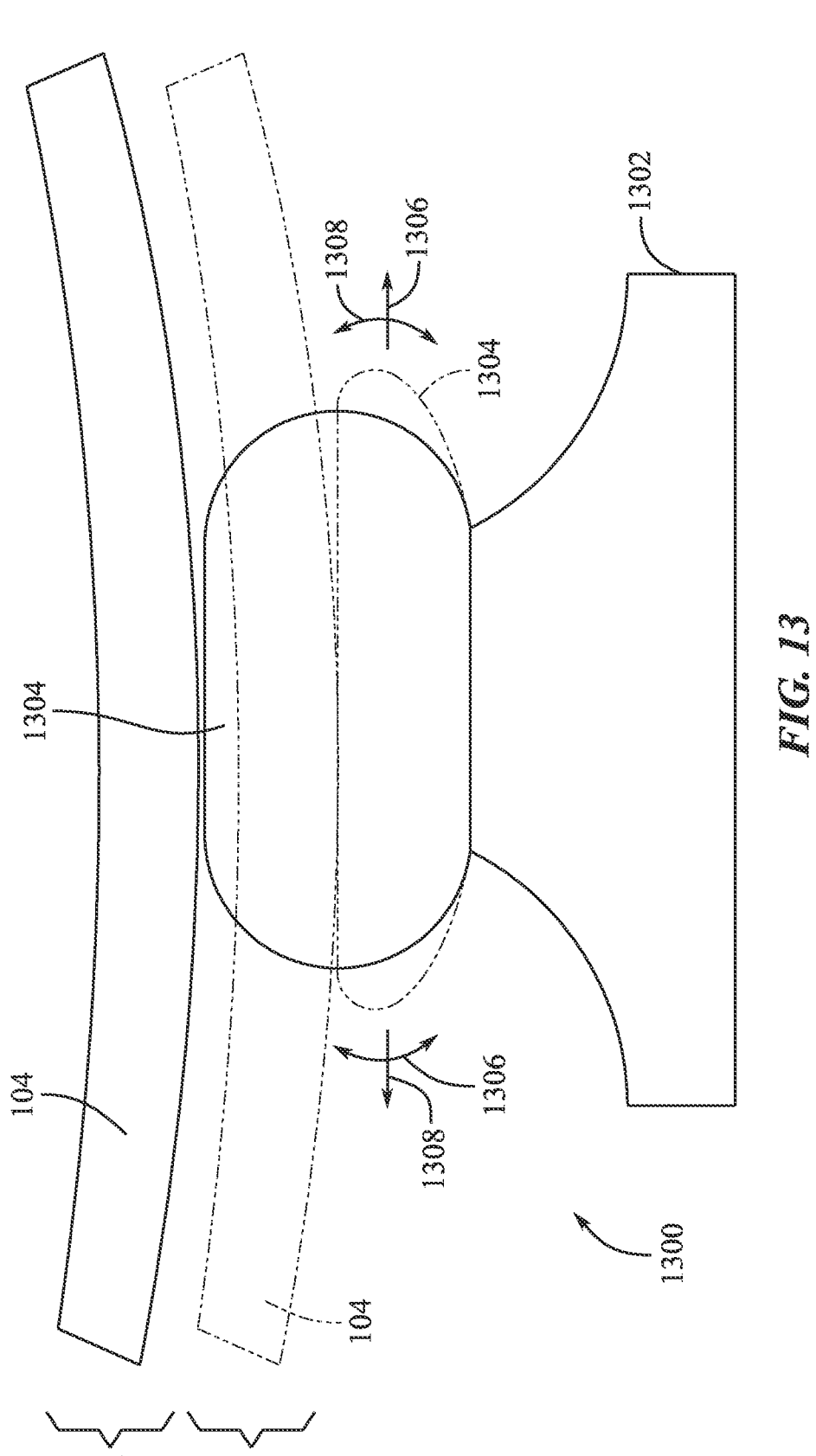
FIG. 13 shows a side view of another example connector.

FIG. 13 illustrates another example connector 1300 in accordance with one or more examples of the present disclosure. As shown, the connector 1300 can include a frame portion 1302 and a compressible portion 1304. The frame portion 1302 can include a connecting element such as a post, a standoff, or a protrusion that extends from an enclosure, a housing, a skeletal frame, or a support member of an HMD display. Thus, in some examples, the frame portion 1302 can include a rigid (or semi-rigid) portion. In some examples, the frame portion 1302 can transfer and disperse applied loads from the facial interface 104 to other portions of a display frame or housing.

According to some examples, the compressible portion 1304 can include a variety of flexible materials providing compressibility or a pliant response to applied loads from the facial interface 104. For example, the compressible portion 1304 can include an elastomer material, a silicone material, a gel material, etc. In these or other examples, the compressible portion 1304 can also include other design features for a tunable response, such as a variety of shapes, material thickness, hardness or stiffness levels (e.g., as measured according to the Shore D hardness scale), angle of incidence relative to the facial interface 104, etc. Indeed, although portrayed as an oblong oval shape in FIG. 13, the compressible portion 1304 can take on a variety of different form factors. For example, the compressible portion 1304 can include a flat surface to contact the facial interface 104. However, in other examples, the compressible portion 1304 can include a non-flat (or non-planar) surface to contact the facial interface 104. For instance, the compressible portion 1304 can include a contoured surface, a dimpled surface, a pointed surface, etc.

In particular, FIG. 13 shows the connector 1300 being movable from a first state 1301 (e.g., an initial state or pre-donned state before a user dons the HMD) to a second or different state 1303 shown in dashed lines (e.g., a compressed state or worn state). In the second state 1303, the facial interface 104 (in response to a user donning the HMD) is displaced causing the compressible portion 1304 to compress downwards toward the frame portion 1302. In particular examples of the second state 1303, the compressible portion 1304 can contort, bend, flex, twist, depress, squish, flatten, or otherwise move to flexibly contact the facial interface 104. A variety of different distances of travel or compression may be implemented, as may be desired.

In these or other examples, the connector 1300 can be free of motion constraint such that the facial interface 104 is free to move in any number of directions 1306, 1308 relative to the connector 1300. By decoupling the facial interface 104 from the connector 1300, the connector 1300 can provide increased levels of compliance (e.g., while also reducing design complexity).

Any of the features, components, and/or parts, including the arrangements and configurations thereof shown in FIG. 13, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 13.

In some examples, the gathering and use of personal information data can be used to the benefit of users. For example, the personal information data can be used to improve the present systems and methods and can be used to personalize the system to the user. However, if used, the collection, analysis, disclosure, transfer, storage, or other use of such personal information data should comply with well-established privacy policies and/or privacy practices, and should minimize risks of unintentional or unauthorized access or use.

The present description, uses specific nomenclature to provide a thorough understanding of the described examples. However, the specific details are not essential in order to practice the described examples. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An apparatus comprising:
a head-mountable display including an outer housing and a display within the outer housing;
a facial interface coupled to the outer housing;
a connector coupled directly between the display and the facial interface, the connector comprising a bowl, a pin, and a stop, the bowl defining a receptacle defined within the display, the connector providing a first degree of freedom along a first axis and along a second axis perpendicular to the first axis, the first axis and the second axis being perpendicular to a longitudinal axis of the connector; and a wearable strap connected to at least one of the outer housing or the facial interface.

2. The apparatus of claim 1, wherein the connector includes a piston connection.

3. The apparatus of claim 1, wherein the connector further provides a second degree of freedom.

4. The apparatus of claim 3, wherein:

the second degree of freedom comprises an axial depth degree of freedom in a second plane.

5. The apparatus of claim 1, wherein the connector comprises a pin-and-bowl connector.

6. The apparatus of claim 1, wherein a portion of the connector is preloaded.

7. The apparatus of claim 1, wherein the connector is positioned at a maxilla face region when the apparatus is donned.

8. The apparatus of claim 1, wherein the connector comprises a compressible portion.

9. The apparatus of claim 8, wherein a surface of the compressible portion is adhered to the stop.

10. A wearable apparatus comprising:

a housing:

a movable display assembly in the housing;

a facial interface coupled to the housing;

a connector movably constraining the movable display assembly directly relative to the facial interface, wherein the connector is coupled to a display of the display assembly and to the facial interface in a region of the facial interface configured to contact a maxilla region of a face; and wherein the display defines a recessed engagement portion configured to slidably receive the connector, wherein the connector is configured to laterally slide relative to the recessed engagement portion.

11. The wearable apparatus of claim 10, wherein the movable connector comprises a proud engagement portion.

12. The wearable apparatus of claim 11, wherein the proud engagement portion comprises a slidable post.

13. The wearable apparatus of claim 10, the recessed engagement portion positioned on the movable display or on the facial interface.

14. The wearable apparatus of claim 13, wherein the recessed engagement portion defines a slidable-post track.

15. The wearable apparatus of claim 14, wherein the proud engagement portion slides along the slidable-post track.

16. A head-mountable device, comprising:

a frame;

a display coupled within the frame;

a facial interface coupled to the frame;

a wearable strap connected to at least one of the frame or the facial interface; and a ball-and-socket connection between the display and the facial interface, the display defining a recessed portion configured to receive the ball-and-socket connection, the ball-and-socket connection positioned on the facial interface at a region configured to contact a maxilla region of a face, wherein the facial interface is configured to translate laterally relative to the display via the ball-and-socket connection.

17. The head-mountable device of claim 16, further comprising a floating connection between the display and the facial interface, the floating connection positioned at a zygoma region of a face.

18. The head-mountable device of claim 17, wherein the floating connection comprises a foam material.

19. The head-mountable device of claim 16, wherein the ball-and-socket connection comprises a travel.

20. The head-mountable device of claim 19, wherein the ball-and-socket connection comprises a stop that bounds the travel.

* * * * *